United States Patent
Sanchez, Jr.

(10) Patent No.: US 6,685,146 B1
(45) Date of Patent: Feb. 3, 2004

(54) PIÑATA-MANIPULATING STAND

(76) Inventor: Felix Sanchez, Jr., 2814 Hadley Rd., Lapeer, MI (US) 48446

( * ) Notice: Subject to any disclaimer, the term of this patent is extended or adjusted under 35 U.S.C. 154(b) by 0 days.

(21) Appl. No.: 10/033,612

(22) Filed: Jan. 2, 2002

(51) Int. Cl.⁷ .............................. B47F 5/00; B47F 7/00
(52) U.S. Cl. ................. 248/125.7; 248/125.8; 248/157; 248/145; 248/181.1; 473/417; 473/418
(58) Field of Search ............... 248/125.7, 125.8, 248/125.9, 157, 161, 415, 145, 181.1, 181.2; 473/417, 418, 451, 453, 457

(56) References Cited

U.S. PATENT DOCUMENTS

| | | | | |
|---|---|---|---|---|
| 1,708,761 A | * | 4/1929 | Horbath | 108/8 |
| 1,751,895 A | * | 3/1930 | Stewart | 462/83 |
| 2,681,783 A | * | 6/1954 | Smith | 248/181.1 |
| 4,756,109 A | * | 7/1988 | Marcus | 40/613 |
| 4,832,337 A | * | 5/1989 | Estrada | 273/440 |
| 5,238,251 A | * | 8/1993 | Staka | 473/429 |
| 5,303,914 A | * | 4/1994 | Cooksey | 473/429 |
| 5,330,143 A | * | 7/1994 | Rich et al. | 223/120 |
| 5,374,056 A | * | 12/1994 | Scher et al. | 473/418 |
| 5,449,138 A | * | 9/1995 | Ciancio | 248/123.2 |
| 5,472,186 A | * | 12/1995 | Paulsen | 473/429 |
| 5,639,055 A | * | 6/1997 | Fritz | 248/176.1 |
| 5,685,788 A | * | 11/1997 | Shy et al. | 473/423 |
| 5,833,555 A | * | 11/1998 | Jer-Min | 473/429 |
| 5,924,930 A | * | 7/1999 | Stewart | 473/29 |
| 5,928,092 A | * | 7/1999 | Keeter et al. | 473/417 |
| 6,030,299 A | * | 2/2000 | Denny | 473/423 |
| 6,412,736 B1 | * | 7/2002 | Zaragoza | 248/125.8 |

* cited by examiner

Primary Examiner—Kimberly Wood

(57) ABSTRACT

A piñata-manipulating stand for more easily maneuvering and controlling a piñata. The piñata-manipulating stand includes an arm assembly for supporting and controlling a piñata. An upright support member is provided for supporting the arm assembly. A coupling assembly is coupled to and positioned between the arm assembly and the upright support member for rotationally coupling the arm assembly to the upright support member. A base member is mounted to an end of the upright support member for supporting the upright support member in an upright position.

5 Claims, 3 Drawing Sheets

PIÑATA-MANIPULATING STAND

BACKGROUND OF THE INVENTION

1. Field of the Invention

The present invention relates to piñata stands and more particularly pertains to a new piñata-manipulating stand for more easily maneuvering and controlling a piñata.

2. Description of the Prior Art

The use of piñata stands is known in the prior art. More specifically, piñata stands heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,832,337; U.S. Pat. No. 4,118,027; U.S. Pat. No. 5,072,910; U.S. Pat. No. 6,082,685; U.S. Pat. No. 5,718,087; and U.S. Pat. No. Des. 379,401.

For years people have enjoyed playing with piñatas. The problem encountered with piñatas is that they require being tied to an elevated structure in order to be used. This limitation forced its use in limited areas. When a piñata is used outdoors for instance it is often tied to a tree branch or elevated clothesline. When a piñata is used indoors it is often secured to a ceiling. However, if a tree branch was not available or a user did not want to secure the piñata to the ceiling a piñata could not be used. Stands for piñatas have been developed. However, they are generally upright structures that hold a piñata in a stationary position.

In these respects, the piñata-manipulating stand according to the present invention substantially departs from the conventional concepts and designs of the prior art, and in so doing provides an apparatus primarily developed for the purpose of more easily maneuvering and controlling a piñata.

SUMMARY OF THE INVENTION

In view of the foregoing disadvantages inherent in the known types of piñata stands now present in the prior art, the present invention provides a new piñata-manipulating stand construction wherein the same can be utilized for more easily maneuvering and controlling a piñata.

The general purpose of the present invention, which will be described subsequently in greater detail, is to provide a new piñata-manipulating stand apparatus and method which has many of the advantages of the piñata stands mentioned heretofore and many novel features that result in a new piñata-manipulating device which is not anticipated, rendered obvious, suggested, or even implied by any of the prior art piñata stands, either alone or in any combination thereof.

While these devices fulfill their respective, particular objectives and requirements, the aforementioned patents do not disclose a new piñata-manipulating stand. The inventive device includes an arm assembly for supporting and controlling a piñata. An upright support member is provided for supporting the arm assembly. A coupling assembly is coupled to and positioned between the arm assembly and the upright support member for rotationally coupling the arm assembly to the upright support member. A base member is mounted to an end of the upright support member for supporting the upright support member in an upright position.

There has thus been outlined, rather broadly, the more important features of the piñata-manipulating stand in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is an object of the present invention to provide a new piñata-manipulating stand apparatus and method which has many of the advantages of the piñata stands mentioned heretofore and many novel features that result in a new piñata-manipulating device which is not anticipated, rendered obvious, suggested, or even implied by any of the prior art piñata stands, either alone or in any combination thereof.

Still another object of the present invention is to provide a new piñata-manipulating device for more easily maneuvering and controlling a piñata.

Still yet another object of the present invention is to provide a new piñata-manipulating stand that can be used in any location. If it is raining outdoors the piñata-manipulating stand can be easily collapsed transported indoors.

Even still another object of the present invention is to provide a new piñata manipulating device that can be moved and manipulated to provide for a more enjoyable piñata playing experience.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
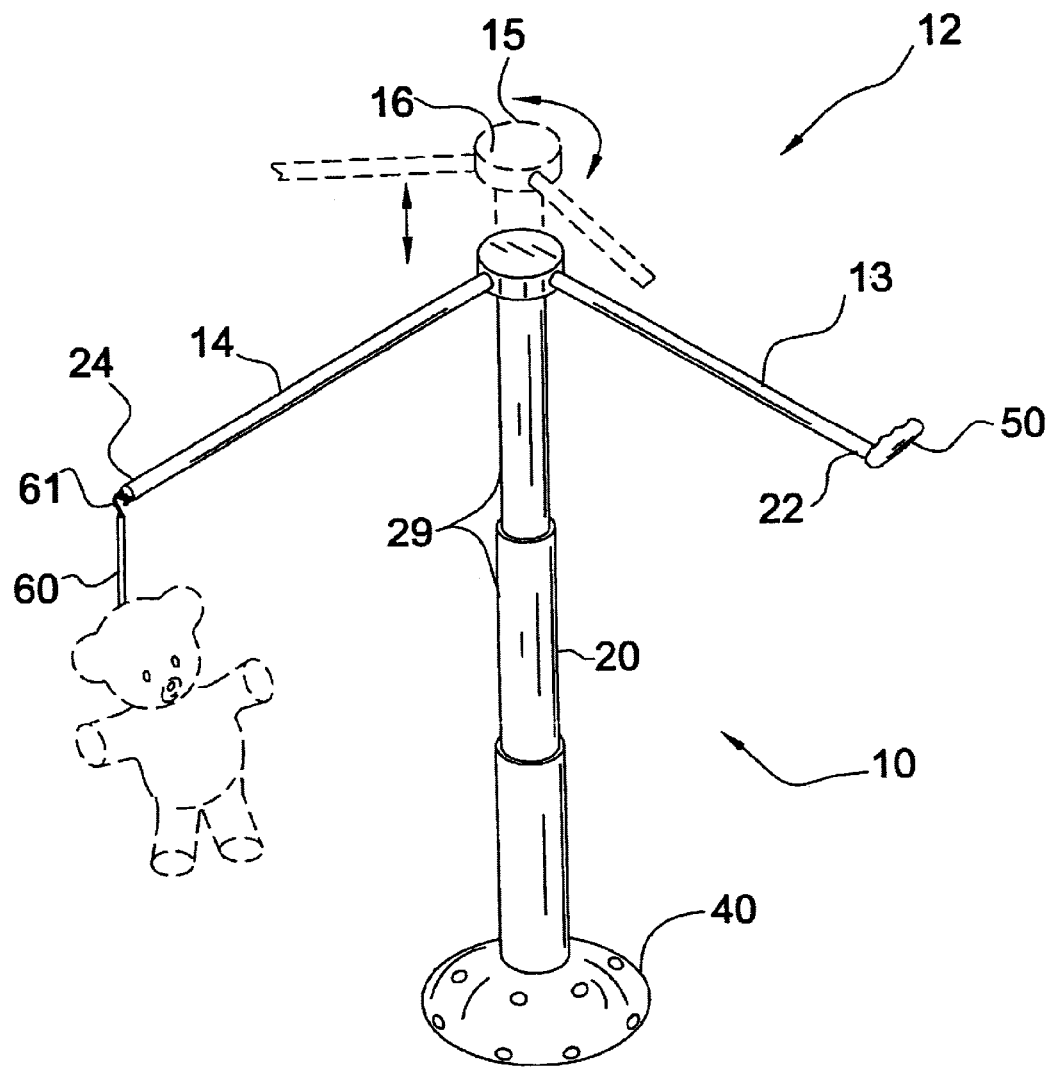
FIG. 1 is a perspective view of a new piñata-manipulating stand according to the present invention.

With reference now to the drawings, and in particular to FIGS. 1 through 4 thereof, a new piñata-manipulating stand embodying the principles and concepts of the present invention and generally designated by the reference numeral 10 will be described.

As best illustrated in FIGS. 1 through 4, the piñata-manipulating stand 10 generally comprises an arm assembly 12 for supporting and controlling a piñata. An upright support member 20 is provided for supporting the arm assembly 12. The piñata-manipulating stand 10 also comprises a coupling assembly 30 for rotationally coupling the arm assembly 12 to the upright support member 20. The coupling assembly 30 is coupled to and positioned between the arm assembly 12 and the upright support member 20. A base member 40 is mounted to an end of the upright support member 20 for supporting the upright support member 20 in an upright position.

The arm assembly 12 may include an elongate control arm 13 for gripping by a hand of a user. The arm assembly 12 may also include an elongate support arm 14 for supporting the piñata above a ground surface. The arm assembly 12 may additionally include a coupling member 15 that is coupled to an end of the elongate control 13 and support 14 arms.

Figure 4:
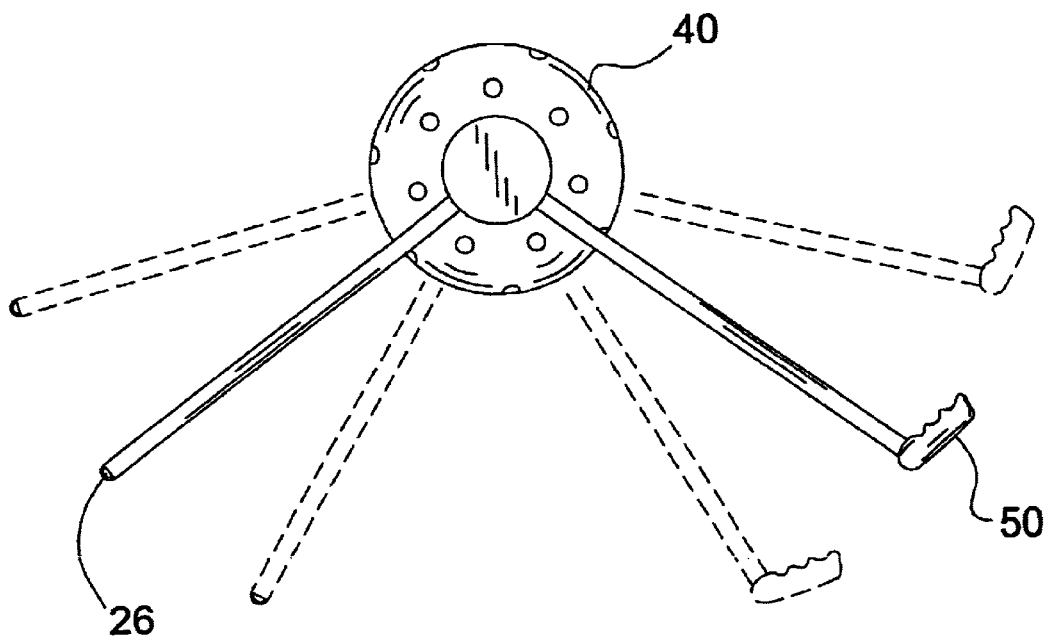
FIG. 4 is a top planar view of the present invention.

As illustrated in FIGS. 1 and 4, a handle 50 may be mounted on an end of the elongate control arm 13 for gripping by a hand of a user. The handle 50 may have a generally undulating outer surface for defining a gripping area for fingers of a user. A longitudinal axis of the handle 50 may be orientated generally perpendicular to a longitudinal axis of the elongate control arm 13.

The coupling member 15 may include an upper surface 16, a lower surface 17 and a lateral surface 18. The elongate control 13 and support 14 arms may be coupled to the lateral surface 18. In one embodiment of the present invention, as particularly illustrated in FIGS. 1 and 3, the coupling member 15 is generally disc shaped. However, the coupling member 15 may employ various shapes.

Figure 3:
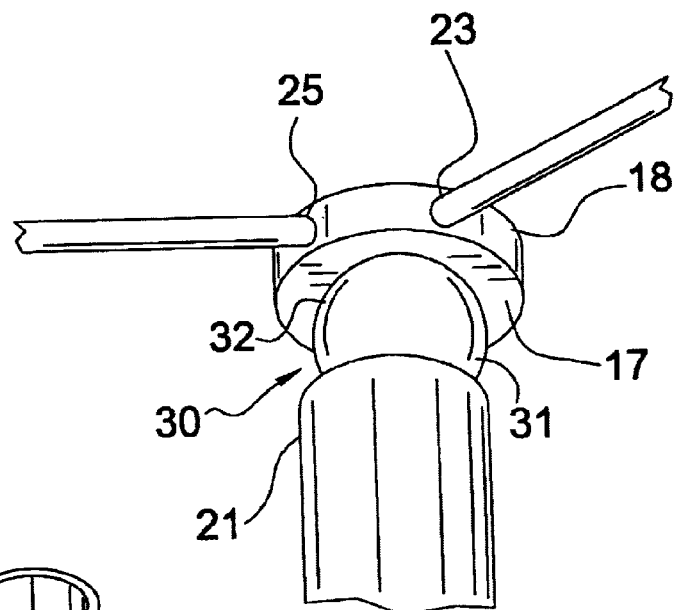
FIG. 3 is a fractional perspective view of the present invention showing a coupling assembly.

The elongate control arm 13 has a first end 22 and a second end 23. The second end 23 of the elongate control arm 13 is mounted to the coupling member 15. As illustrated in FIGS. 1 and 3, the elongate control arm 13 may be generally tubular. However, the elongate control arm 13 may comprise any shape.

The elongate support arm 14 has a first end 24 and a second end 25. The second end 25 of the elongate support arm 14 is mounted to the coupling member 15. As illustrated in FIGS. 1 and 4, the elongate support arm 14 may be generally tubular. However, the elongate support arm 14 may comprise any shape.

As illustrated in FIGS. 1 and 4, an arcuate member 26 may be mounted to the first end 24 of the elongate support arm 14. The arcuate member 26 may have a pair of ends with each of the ends being mounted to the first end 24 of the elongate support arm 14. The arcuate member 26 may comprise a substantially rigid material such as, for example, an aluminum, steel or plastic material. However, any material may be employed.

Figure 2:
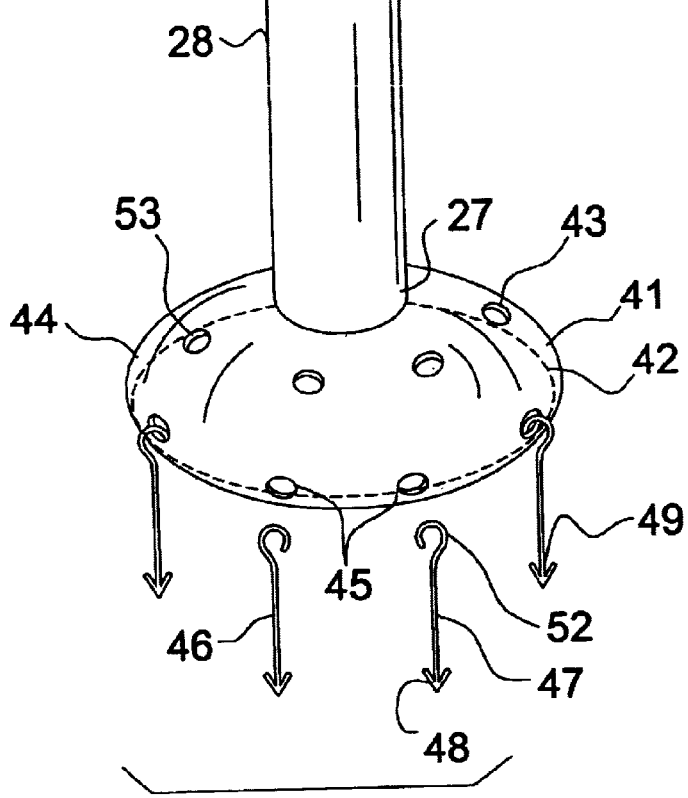
FIG. 2 is a perspective view of the present invention showing a base.

The upright support member 20 has opposed first 21 and second ends 27. The first end 21 is mounted to the coupling assembly 30. The second end 27 is mounted to the base member 40. In one embodiment of the present invention, as illustrated in FIGS. 1 and 2, the upright support member 20 includes an elongate tubular base member 28 that is mounted to the base member 40.

The upright support member 20 may additionally include a plurality of elongated tubular sectional members 29 that are telescopingly disposed in the elongated base tubular member 28. The elongate tubular base member 28 and elongate tubular sectional members 29 each have an outer diameter. The outer diameter of the elongate tubular base member 28 and each of the elongate tubular sectional members 29 may taper from the base member 40 toward the coupling assembly 30.

The upright support member 20 may comprise a conventional telescoping stand that may be telescopingly adjustable to a particular height. Conventional means of adjusting a height of a telescoping stand are known in the art and may be employed.

As illustrated in FIGS. 1 and 4, the base member 40 has an upper wall 41 and a lower wall 42 defining an interior 43 of the base member 40. In one embodiment of the present invention, a portion of the upper wall 41 of the base member 40 extends beyond a juncture of the upper 41 and lower 42 walls defining an anchoring portion 44 of the base member 40. In one embodiment of the present invention, as particularly illustrated in FIG. 2, the anchoring portion 44 of the base member 40 has a plurality of spaced openings 45 extending therethrough.

As illustrated in FIG. 2, a means for securing 46 the base member 40 to the ground may be provided. The means of securing 46 the base member 40 may be removably extendable through each of the openings 45. The means of securing 46 the base member 40 may comprise an elongated rod 47 that has a pair of barbs 48 mounted on a first end 49 of the elongated rod 47. A second end 52 of the elongated rod 47 is preferably generally arcuate for extending through the openings 45 and hooking onto a portion of the anchoring portion 44 of the base member 40.

In one embodiment of the present invention, the upper wall 41 of the base member 40 has at least one port 53 that extends through the upper wall 41 for permitting a user to pour a means of weighing the base member 40 into the interior 43 of the base member 40. As particularly illustrated in FIG. 4, the present invention may include a plurality of spaced ports 53 positioned about the upper wall 41 of the base member 40. The means of weighing the base member 40 may comprise water or sand. However, any type of material capable of weighing down the base member 40 may be employed.

In one embodiment of the present invention, as particularly illustrated in FIG. 3, the coupling assembly 30 may include a boss 31 that is mounted on the first end 21 of the upright support member 20. The coupling assembly 30 may additionally includes seat 32 that is mounted on the lower surface 17 of the coupling member 15 of the arm assembly 12. The seat 32 is preferably seated on the boss 31 such that the arm assembly 12 may be rotated in vertical and horizontal directions.

The coupling assembly 30 may comprise a ball and socket with the boss 31 having a generally spherical shape and the seat 32 having a generally socket shape providing nearly 360 degrees of rotation.

As illustrated in FIG. 1, a tether 60 may be included for securing a piñata to the elongated support arm 14. The tether 60 may include an end hook portion 61 for hooking onto the arcuate member 26 mounted on the elongated support arm 14. An end of the tether 60 may be securable to a piñata. The tether may comprise a resiliently flexible material such as, for example, a rope material. However, the tether 60 may also comprise a substantially rigid material such as, for example, a plastic material.

In use, the piñata-manipulating stand 10 is positioned in a game playing area. Depending upon the height of participates, the upright support member 20 may be vertically adjusted such that the arm assembly 12 is positioned above a user's head.

If the piñata-manipulating stand 10 is being used outdoors the means of securing 46 the base member 40 may be inserted into the ground and hooked onto the anchoring portion 44 of the base member 40. If the piñata-manipulating stand 10 is being used indoors a means of weighing the base member 40 down may be poured through the port 53 into the interior 43 of the base member 40.

A piñata is coupled to the elongate support arm 14 by the tether 60. Once the piñata is coupled to the elongate support arm 14 a user is positioned under the piñata suspended from the elongate support arm 14. Another user may then move the piñata in a horizontal and vertical direction by manipulating the elongate control arm 13. The user positioned under the piñata attempts to hit the moving piñata with a stick in order to rupture the piñata and disperse its contents onto the ground.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the piñata-manipulating stand. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A piñata-manipulating stand for supporting and maneuvering a piñata, said stand comprising:
   an arm assembly for supporting and controlling a piñata, said arm assembly includes:
      an elongate control arm for gripping by a hand of a user;
      an elongate support arm for supporting the piñata; and
      a coupling member being coupled to each end of said elongate control and support arms;
   an upright support member for supporting said arm assembly;
   a coupling assembly being coupled to and positioned between said arm assembly and said upright support member for rotationally coupling said arm assembly to said upright support member; and
   a base member being mounted to a first end of said upright support member for supporting said upright support member in an upright position, said base member has an upper wall and a lower wall defining an interior space of said base member, wherein a portion of said upper wall of said base extends beyond a juncture of said upper and lower walls defining an anchoring portion of said base member.

2. The piñata-manipulating stand of claim 1, wherein said anchoring portion of said base member has a plurality of spaced openings extending therethrough.

3. The piñata-manipulating stand of claim 2, additionally including a means for securing said base member to the ground, said means of securing said base member being removably extendable through each of said openings.

4. The piñata-manipulating stand of claim 3, wherein said means of securing said base member comprises an elongated rod having a pair of barbs mounted on a first end of said elongated rod, a second end of said elongated rod being generally arcuate for extending through said openings and hooking onto said anchoring portion of said base member.

5. A piñata-manipulating stand for supporting and maneuvering a piñata, said stand comprising:
   an arm assembly for supporting and controlling a piñata, said arm assembly includes:
      an elongate control arm for gripping by a hand of a user;
      an elongate support arm for supporting the piñata; and
      a disc shaped coupling member being coupled to each end of said elongate control and support arms, wherein said arms are positioned at an angle relative to one another;
   an upright support member for supporting said arm assembly;
   a coupling assembly being coupled to and positioned between said arm assembly and said upright support member for rotationally coupling said arm assembly to said upright support member, wherein said coupling assembly includes:
      a spherical boss being mounted on a first end top surface of said upright support member;
      a socket shaped seat being mounted on a lower surface of said disc shaped coupling member of said arm assembly, wherein said seat is seated on said boss such that said coupling assembly allows said arm assembly to be vertically and horizontally rotatable by said user; and
   a base member being mounted to a second of said upright support member for supporting said upright support member in an upright position, said base member has an upper wall and a lower wall defining an interior space of said base member.

\* \* \* \* \*